United States Patent
Etemad et al.

(10) Patent No.: US 6,738,366 B1
(45) Date of Patent: May 18, 2004

(54) SYSTEM AND METHOD FOR USING INHIBIT SENSE MULTIPLE ACCESS (ISMA) PROTOCOL AND A CAPTURE MESSAGE TO OPTIMIZE RANDOM ACCESS CONTROL AND DATA PACKET COMMUNICATION BETWEEN ACCESS TERMINALS AND A BASE STATION OVER A WIRELESS REVERSE COMMON CHANNEL

(75) Inventors: Kamran Etemad, Gaithersburg, MD (US); Khalid Karimullah, Olney, MD (US)

(73) Assignee: Hughes Electronics Corporation, El Segundo ( * ) Notice: Subject to any disclaimer, the term of this patent is extended or adjusted under 35 U.S.C. 154(b) by 0 days.

(21) Appl. No.: 09/478,452

(22) Filed: Jan. 6, 2000

Related U.S. Application Data
(60) Provisional application No. 60/131,576, filed on Apr. 29, 1999.

(51) Int. Cl.[7] .............................................. H04B 7/212
(52) U.S. Cl. ....................... 370/337; 370/347; 370/461; 370/462
(58) Field of Search ................................ 370/335, 322, 370/348, 461, 462, 337, 347, 445, 443, 447

(56) References Cited

U.S. PATENT DOCUMENTS

| | | | | |
|---|---|---|---|---|
| 5,150,362 A | * | 9/1992 | Akerberg | 370/331 |
| 5,295,140 A | * | 3/1994 | Crisler et al. | 370/443 |
| 5,379,290 A | * | 1/1995 | Kleijne | 370/313 |
| 5,535,210 A | * | 7/1996 | Smolinske et al. | 370/461 |
| 6,078,577 A | * | 6/2000 | Bishop et al. | 370/348 |
| 6,259,724 B1 | * | 7/2001 | Esmailzadeh | 375/143 |
| 6,278,703 B1 | * | 8/2001 | Neufeld | 370/342 |
| 6,442,153 B1 | * | 8/2002 | Dahlman et al. | 370/342 |
| 6,519,233 B1 | * | 2/2003 | Gutierrez | 370/320 |

* cited by examiner

*Primary Examiner*—Chau Nguyen
*Assistant Examiner*—Soon-Dong Hyun
(74) *Attorney, Agent, or Firm*—John T. Whelan

(57) ABSTRACT

A system and method for optimizing random access control, and for optimizing transmission efficiency of data packets over reverse common channels between access terminals and a base station, in a wireless communications system. In the communications system, at least one of the access terminals is adapted to transmit at least a portion of an access data packet to the base station, and the base station is adapted to receive the portion of the access data packet and, in response, to transmit a message for receipt by the plurality of access terminals which indicates receipt of the access data packet portion by the base station and identifies the access terminal from which said access data packet portion is received. The message can control the other access terminals to refrain from transmitting an access data packet, while indicating receipt of the access data packet portion to the certain access terminal from which the access data packet portion had been transmitted. The base station can also provide power control signals to control transmission power of that certain access terminal, and to control that certain access terminal to transmit over certain reverse channels. Accordingly, interference between access data packets being transmitted by multiple access terminals and being received in the same time slot by a base station in a wireless communications system can also be minimized.

5 Claims, 2 Drawing Sheets

SYSTEM AND METHOD FOR USING INHIBIT SENSE MULTIPLE ACCESS (ISMA) PROTOCOL AND A CAPTURE MESSAGE TO OPTIMIZE RANDOM ACCESS CONTROL AND DATA PACKET COMMUNICATION BETWEEN ACCESS TERMINALS AND A BASE STATION OVER A WIRELESS REVERSE COMMON CHANNEL

This application claims the benefit under 35 U.S.C. §119(e) of a U.S. provisional application of Kamran Etemad and Khalid Karimullah entitled "An Inhibit Sense Multiple Access Based Scheme Optimized for Random Access Control and Data Packet Communication Over a Wireless Reverse Common Channel", Ser. No. 60/131,576, filed on Apr. 29, 1999, the entire contents of which is incorporated by reference herein.

BACKGROUND OF THE INVENTION

1. Field of the Invention

The present invention relates to a system and method for optimizing random access control, and for optimizing transmission efficiency of data packets over reverse common channels between access terminals and a base station, in a wireless communications system. More particularly, the present invention relates to a system and method for using inhibit sense multiple access (ISMA) protocol and a capture message to optimize random access control, and to optimize transmission of variable length/multi-frame data packets over a contention-based reverse link common channel between access terminals and a base station, in a wireless communications system.

2. Description of the Related Art

Wireless communications systems, such as wireless mobile telephone systems, include a plurality of mobile access terminals, such as mobile telephones, and a plurality of base stations (BS). Each BS provides service to a particular region on the earth's surface, commonly referred to as a "cell", to enable mobile access terminals within the cell to communicate with, for example, other mobile access terminals within that or other cells of the system, or with telephones of a PSTN network.

As can be appreciated by one skilled in the art, when a user places a call or otherwise initiates communication via a mobile access terminal, the mobile access terminal initiates communication with the BS servicing the cell in which the mobile access terminal resides by performing a random access attempt on a reverse common channel (RCCH) which the BS continuously monitors. In conventional point-to-multipoint wireless communications systems, such as wireless mobile communications systems, a protocol known as "slotted ALOHA" is used for the random access attempt.

In accordance with the slotted Aloha protocol, access transmission by a mobile access terminal is required to begin only at distinct periodic time instants. The timing of the periodic time instants is derived from a forward common broadcast channel transmitted by the BS to be received by all mobile access terminals within the cell being serviced by the BS. All mobile access terminals typically randomize their transmission time to one of the valid transmission instants, and transmit their access data packets on an RCCH. Hence, the mobile access terminal initiating the access attempt will randomize its transmission time to one of the valid transmission instants and transmit its access data packet on an RCCH at that time.

Immediately after the mobile access terminal has completed transmission of its access data packet, the mobile access terminal monitors the Forward Common Control Channel (F-CCCH) for a response from the BS. If the BS has successfully received the access data packet, the BS sends a response message to the mobile access terminal on the F-CCCH and, consequently, communication between the BS and the mobile access terminal is established.

Although different mobile access terminals may initiate an access attempt at about the same time, access data packets from different mobile access terminals generally will arrive at the BS in different time slots. However, depending upon the number of access terminals attempting access, more than one access data packet signal may fall within the same time slot. In a time-divisional multiple access (TDMA) based system, this collision of access data packet signals results in a failed access attempt for all access terminals whose access data packet signals occupy that time slot. On the other hand, in a code division multiple access (CDMA) based system, when two or more access data packet signals using a common access code channel fall within the same access slot, one of the access data packet signals can be "captured" (i.e. detected and demodulated) as long as the access data packet signals arrive at the access receiver of the BS more than one chip delay apart. In this event, the other non-captured access data packet signals become undesirable interference, which results in a loss in capacity and reduction in throughput in the communications system.

As can be appreciated by one skilled in the art, a conventional CDMA based communications system employing the slotted ALOHA protocol provides no mechanism to prevent access attempts from other access terminals while the captured access data packet signal is being demodulated, nor does such a system have the capability of suspending the transmissions of the other colliding access data packet signals before their entire packet transmission is completed. These deficiencies can cause significant performance degradation, especially in systems in which data is transmitted in variable size (i.e. multi-frame) packets.

Another deficiency of the slotted Aloha protocol used in IS-95B communications systems and in some other conventional communications systems is that the access terminals in these systems transmit their data packets in a fixed slot size, which is set to be equal to a fixed number of frames appropriate to accommodate the access data packet. However, as can be appreciated by one skilled in the art, using a fixed slot size for transmitting data packets of different lengths is not efficient. For example, when data packets smaller than access slot size are transmitted in respective slots, part of the slot in which each data packet is transmitted remains empty and is thus wasted. On the other hand, data packets longer than access slot size must be broken into pieces and sent in multiple access slots, which requires additional overhead bits and processing that reduces the efficiency of the system while increasing system complexity.

Accordingly, a continuing need exists for a wireless communications system having increased random access control efficiency and overall increased efficiency of data packet transmission over reverse common channels between access terminals and a base station.

SUMMARY OF THE INVENTION

An object of the present invention is to provide a system and method for optimizing random access control, and for optimizing transmission efficiency of data packets over reverse common channels between access terminals and a base station, in a wireless communications system.

Another object of the present invention is to provide a system and method for minimizing interference between access data packets being transmitted by multiple access terminals and being received in the same time slot by a base station in a wireless communications system.

A further object of the present invention is to provide a system and method for using inhibit sense multiple access (ISMA) protocol and a capture message to optimize random access control, and to optimize transmission of variable length/multi-frame data packets over a contention-based reverse link common channel between access terminals and a base station, in a wireless communications system.

These and other object of the present invention are substantially achieved by providing a wireless communications system and method for using the same, employing a plurality of access terminals and a base station, in which at least one of the access terminals is adapted to transmit at least a portion of an access data packet to the base station, and the base station is adapted to receive the portion of the access data packet and, in response, to transmit a message for receipt by the plurality of access terminals which indicates receipt of the access data packet portion by the base station. The portion of the access data packet can be the entire access data packet, and can include identifying data such as a PN-offset of an access PN-code, while the message can include data indicative of the identifying data in the portion of the access data packet. The base station is also adapted to transmit a control signal for controlling each of the access terminals, other than the access terminal from which the portion of the access data packet is received, to refrain from transmitting a respective access data packet in response to receipt of the message. The base station can further transmit a power control command to the certain access terminal from which the portion of the access data packet is received, to control a transmission power at which the certain access terminal transmits communication data to the base station. In addition, the base station can transmit a control signal to the certain access terminal to control that access terminal to transmit another portion of the data packet over the same or a different reverse common channel for receipt by the base station.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
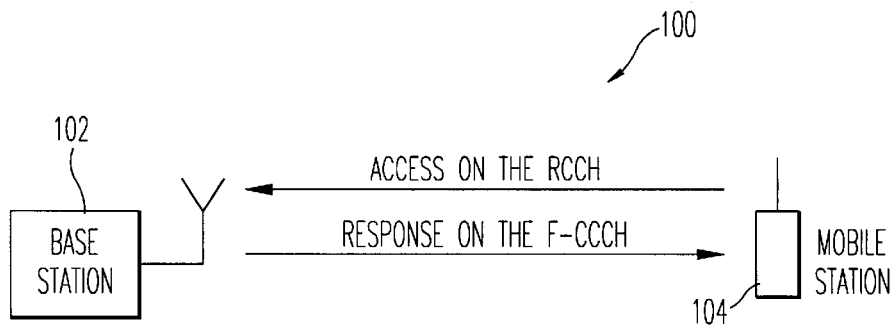
FIG. 1 is a block diagram illustrating communication between a mobile access terminal and a base station of a wireless communications system that occurs when the mobile access terminal initiates an access attempt on the reverse common channel to establish communication with the base station.

A wireless communications system 100, such as a wireless mobile telephone system described in the Background section above, is shown in FIG. 1. As illustrated, the wireless communications system 100 includes at least one base station (BS) 102 and at least one mobile access terminal 104, such as a mobile telephone.

As described above, when communication is initiated via mobile access terminal 104, the mobile access terminal 104 transmits an access data packet on the reverse common channel (RCCH) which the BS 102 continuously monitors. The system 100 can be a TDMA or CDMA based system, and the mobile access terminal 104 can transmit its access data packet in accordance with the slotted ALOHA protocol described above.

As will now be described, the performance of the basic slotted ALOHA protocol in TDMA and CDMA based wireless communications systems can be significantly enhanced through the use of an Inhibit Sense Multiple Access (ISMA) technique or protocol according to the present invention, especially when the access terminals 104 are capable of transmitting access data packets of variable duration. According to the ISMA protocol, the base station 102 interpolates its Forward Common Control Channel (F-CCCH) with uncoded BUSY/IDLE bits (BIB), which occur periodically in the forward link to indicate the status of the RCCH to the mobile access terminals 104 being serviced by the base station 102. In the other portion of the F-CCCH, the capture message is sent. The period of the BIBs is very short in comparison to the duration of the access data packet in the reverse link, and could be as short as the time that elapses between when the base station 102 detects the preamble of an access packet and, in response, sets or resets the BIB in its F-CCCH. This smallest time period is referred to as an ISMA slot.

The ISMA protocol preferably requires that a very short preamble with high probability of detection lead the RCCH packet, that all mobile access terminals 104 being serviced by the BS 102 monitor the BIB status in the F-CCCH, and that the mobile access terminals 104 only transmit an access data packet when the channel over which the access data packet is to be transmitted is idle. The ISMA protocol provides significant enhancement to the TDMA and CDMA based communications systems when the length of the access data packet size is much greater than the length of the ISMA slot.

As can be appreciated by one skilled in the art, the use of ISMA protocol is effective in enabling the base station 102 of the system 100 to prevent access attempts from other access terminals 104 while a captured access data packet signal from an access terminal 104 is being demodulated. Furthermore, the "capture message" enables the base station 102 to suspend the transmission of colliding access data packet signals by other access terminals 104 before their entire transmission has been completed.

Figure 2:
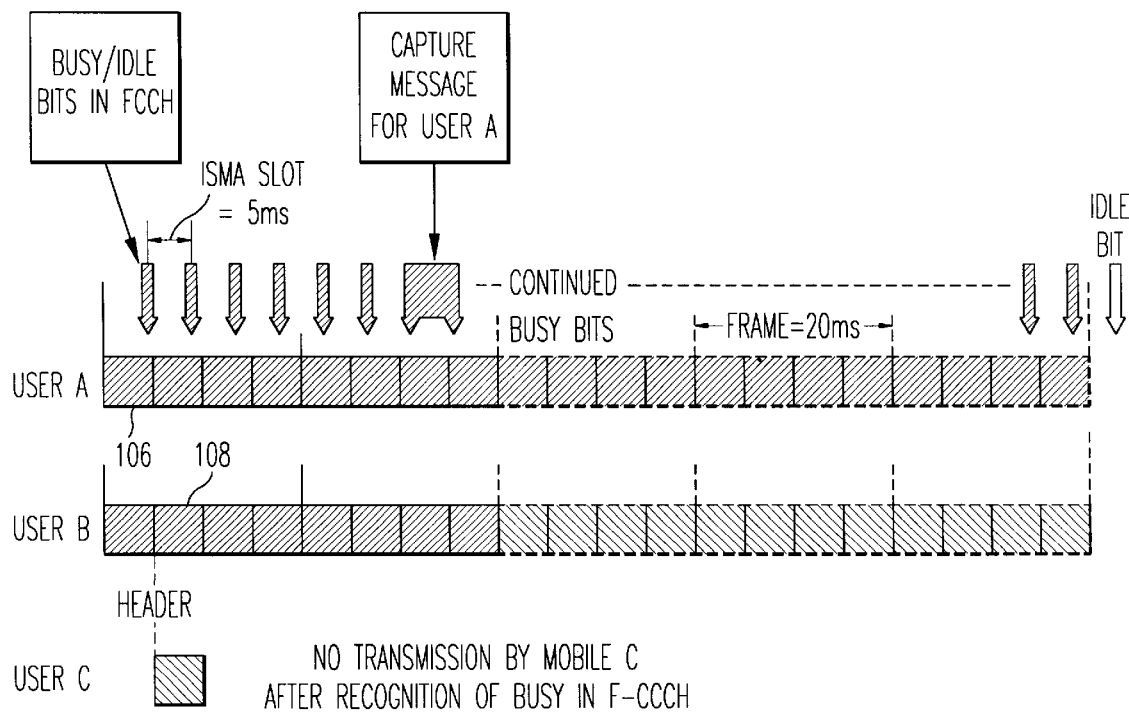
FIG. 2 is a timing diagram showing access data packets being transmitted from different mobile access terminals of a wireless communications system as shown in FIG. 1 using an Inhibit Sense Multiple Access (ISMA) technique according to an embodiment of the present invention.

FIG. 2 illustrates the manner in which access data packets 106 and 108 are transmitted by different access terminals 104, referred to as users A and B, respectively, in a system 100 employing an ISMA protocol using a capture message technique according to an embodiment of the present invention. The ISMA protocol and capture message technique is applicable to CDMA or TDMA based systems, and the terminology used below is in accordance with IS-95 standards as can be appreciated by one skilled in the art.

Also, in this example, an ISMA slot is assumed to have a length of 5 ms, while an access data packet is assumed to have a length of 100 ms, which is divided into five 20 ms frames as shown in FIG. 2. Specifically, an access data packet 106 or 108 starts with a short header immediately followed by the packet data. The short header frame includes, for example, a local unique access terminal identifier which identifies the access terminal transmitting the access data packet. The header frame can also include information pertaining to the type of message type attached, such as a MAC/Signaling message, and possibly some other useful parameters. It is desirable to have the short header fit in one 20 ms frame, as shown. In general, this frame should be as short as possible to identify the access terminal that is transmitting the access data packet, and it does not have to be the same length as the rest of the frames in the access data packet. However, the lengths of an ISMA slot and access data packet, as well as the number of frames in an access data packet and the length of the header, can be any suitable amount as can be appreciated by one skilled in the art.

When an access terminal 104 (see FIG. 1) initiates communication with the BS 102, the access terminal 104 randomly selects one of the random access channels RCCH over which an access data packet is to be transmitted. The access terminal 104 also monitors the BIBs being transmitted by the base station 102 to monitor the busy/idle status of the F-CCCH associated with the selected RCCH. Contention resolution is based on p-persistent ISMA protocol. Once an access terminal 104 finds that the busy/idle status of the F-CCCH is idle, the access terminal transmits its access data packet to the base station 102 with a probability p, as can be appreciated by one skilled in the art.

In the example shown in the FIG. 2, the access terminals identified as users A and B coincidentally decided to begin transmitting their respective access data packets 106 and 108, respectively, in the same ISMA slot. In this event, the BS 102 (see FIG. 1) sets the BIB status in the F-CCCH to busy (as shown by the down arrows) as soon as the BS 102 detects an access data packet signal on the RCCH. In accordance with the ISMA protocol, the other mobile access terminals 104 (e.g., user C) being serviced by the BS 102 will monitor the BIBs being transmitted by the BS 102 and thus detect that the RCCH is busy. Accordingly, as shown in FIG. 2, another access terminal identified as user C will not transmit an access data packet to the BS as long as the status of the BIBs of the F-CCCH indicate that the RCCH is busy.

Once the BS 102 has captured, for example, the access data packet 106 transmitted by user A and sets the BIB status to busy, the BS 102 simultaneously decodes the header contents and sends a capture message on the F-CCCH indicating that the data packet 106 transmitted by user A is captured. Both users A and B, which are tuned to receive the capture message on the F-CCCH, decode this capture message. When user B recognizes that the BS 102 did not capture its access data packet 108 being transmitted, user B will stop transmitting its access data packet 108 as shown in FIG. 2. User A will continue its transmission until completion.

Accordingly, as can be appreciated from the above, the capture message in the F-CCCH stops a non-captured access terminal (e.g., user B) from continuing transmitting its access data packet, and thus interfering with ongoing traffic. Without transmission of this capture message, non-captured access terminals would continue their transmission until their entire access data packets have been transmitted, resulting in unnecessary interference with the captured access data packet. The use of the capture message therefore reduces the overall interference in the system 100, and thus allow for smaller average delay performance of the system.

Specifically, the remainder of access data packet 106 being transmitted by user A is free from interference from data packets being transmitted by other access terminals, such as user B who had attempted access with the same spreading code in the same ISMA slot as user A. Also, due to lack of spreading code ambiguity, the access receiver of the BS may now take advantage of the maximum ratio combining capability of a Multipath Rake receiver to improve the link performance of user A and, if desired, implement reverse link power control using F-CCCH.

As can further be appreciated from the above, it is desirable to reduce the time that elapses for the BS 102 to transmit the capture message once it captures one of the access data packets. Specifically, the amount of time that elapses between when the BS 102 captures an to access data packet and when the BS 102 transmits the capture message has a direct effect on the performance of the RCCH. It is sometimes desirable to limit the amount of the access data packets transmitted by the access terminals 104 prior to capture of one of the access data packets, to avoid interference with the remainder of the captured access data packet by the remainder of other non-captured data packets. Specifically, in some cases, it is desirable to transmit only a header, and then transmit the remainder of the packet after receipt of the capture message.

Figure 3:
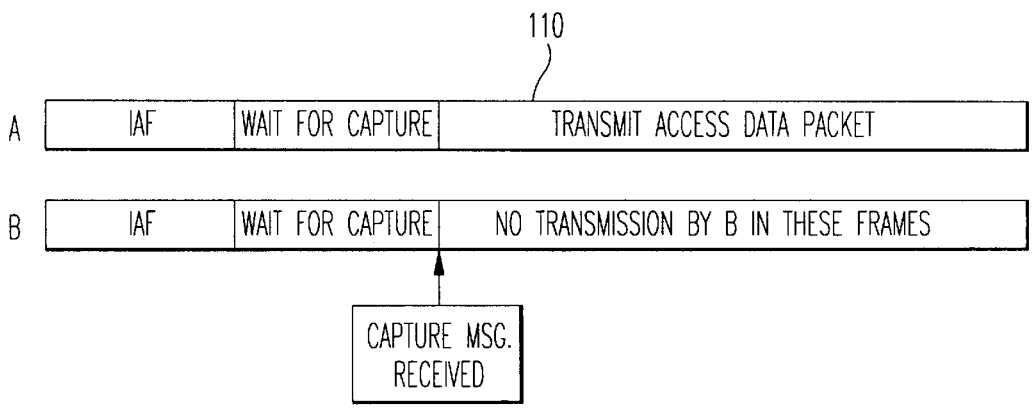
FIG. 3 is a timing diagram showing access data packets being transmitted from different mobile access terminals of a wireless communications system as shown in FIG. 1 using an ISMA technique employing a fast capture technique according to another embodiment of the present invention.
Figure 4:
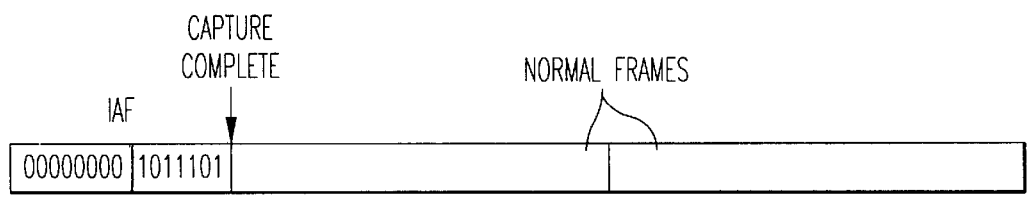
FIG. 4 illustrates further details of an access data packet being transmitted from a mobile access terminal of a wireless communications system as shown in FIG. 1 according to the embodiment of the present invention exemplified in FIG. 3.

A fast capture technique capable of achieving these overall objectives and advantages will now be described with reference to FIGS. 3 and 4. As shown in the timing diagram of FIG. 3, each access terminal 104 identified as users A and B only transmits an Initial Access Frame (IAF) as the leading frame to the BS 102 (see FIG. 1). The IAF can be configured as a specialized shortened frame (header) containing only several data bits, such as data bits representing the address or permuted address of the access terminal (user A). As shown in FIG. 4, for example, this frame may start with a fixed pattern of bits for a preamble (e.g. typically a number n1 of zero's) for easy detection and capture, followed by a short address (e.g., a number n2 of address bits), so that the BS 102 can use the short address right after demodulation of the RCCH. This short address is used in the F-CCCH capture message along with setting BIB to busy.

Also, the configuration of the IAF depends upon the application in which it is used. In general, the IAF should be designed with the condition that the probability of correct word detection (i.e., the address of the corresponding access terminal) is greater than or equal to the probability of preamble detection. In some implementations, the IAF requires a forward error correction (FEC) coded message with cyclic redundant codes (CRC). However, in other applications, the IAF may require only CRC. Furthermore, considering the number of bits needed for the initial capture, the size of an IAF may be shorter than the size of normal data/message bearing frames. Also, the frame sizes may be conveniently defined as different multiples of an ISMA slot, for example, $T_{IAF}=n \times ISMA\ Slot$, $T_{frame}=N \times ISMA\ Slot$, and so on.

Once each user A and B has transmitted its respective IAF, both users A and B then cease transmission, and wait for a time period Tw (ms) to receive the capture message in the F-CCCH as transmitted by the BS 102. The value of Tw can be a system parameter which, for example, can be set to zero if a delay in transmission of the remainder of the access data packet by the user A or B is not to occur.

Assuming that the IAF transmitted by user A is captured as indicated in the F-CCCH capture message, user A will transmit the remainder of its access data packet 110, while user B will refrain from transmitting the remainder of its access data packet. Also, after receiving the capture message, user terminal A may transmit the remainder of its access data packet 110 on the same or another RCCH as described in more detail below. Furthermore, at the time the BS 102 transmits the capture message, or at any time thereafter, the BS 102 can also transmit a signal to the user A instructing the user A to change its rate of data transmission, to change its transmit power, or both.

Figure 5:
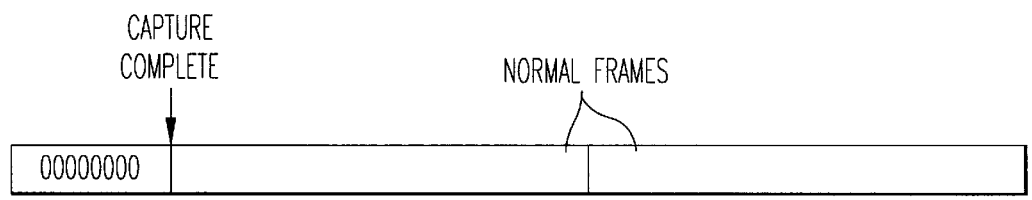
FIG. 5 illustrates a timing diagram of an access data packet being transmitted from a mobile access terminal of a wireless communications system as shown in FIG. 1 using an ISMA technique employing a further fast capture technique according to another embodiment of the present invention.

Another example in which a capture message can be used and configured in CDMA or TDMA based communications systems is exemplified in FIG. 5. Specifically, in this example, the PN-offset of the access long code in the preamble of the access data packet being transmitted by an access terminal 104 (see FIG. 1) can be included in the capture message as a short address representing the address of the access terminal 104 whose access data packet has been captured by the BS 102.

This approach is based on the assumption that each access terminal 104 attempts to access the BS 102 using an access long code having some level of PN randomization which facilitates capture capability in the receiver of the BS 102. An access terminal 104 may select this offset randomly, or select the offset using a MIN/ESN based hashing procedure or any other suitable algorithm or method. In any event, the information pertaining to the offset used by the access terminal 104 is available to the BS 102 right after the BS 102 detects the preamble of a captured access data packet and compares the information in the preamble with its own PN-code phase. In this approach, the number of possible PN offsets available on each access long code should be large enough to provide sufficient addressing capacity. Depending on the cell size and access pattern, a number between 8 and 12 bits may be appropriate.

It is further noted that according to this technique, there is no need for an access terminal 104 to send a short address explicitly and hence, the process for decoding this information in the BS 102 is eliminated. The BS 102 will simply transmit the detected offset in the F-CCCH capture message. Each access terminal 104 monitoring the F-CCCH will then compare the offset value received to the offset value it used in its respective access data packet to determine whether its access data packet has been captured.

The efficiency of data packet transactions on the RCCHs can further be improved by separating the physical channels bearing random access massages from those carrying other messages (e.g., response messages) in the RCCHs. Specifically, the BS 102 (see FIG. 1) can define as part of system parameter messages a set of random access RCCHs, and a separate set of response/scheduled RCCHs to be used only for responses by the access terminals 104 to the BS 102 and other scheduled transmissions on the reverse link, including the SDBs originated by the access terminals 104.

Defining scheduled transmissions on an RCCH provides a configuration symmetry in conjunction with the normal scheduled operation of FCCHs in the forward link. This segregation of common channels allows the BS 102 to redirect an access terminal 104 to transmit its message/data/ response on one of RCCHs that is not subject to contention. By redirecting an access terminal 104 to transmit on a scheduled channel, the BS 102 may allow the access terminal 104 to send its message/data at the most appropriately available rates (e.g. 9.6, 19.2 and 38.4 kbps). If the response RCCHs are used to send scheduled SDB transmissions, the BS 102 may also include information in these transmissions to control the access terminals 104 to control the power of their transmission bursts to obtain a performance beyond the capability of access power control.

This segregation of an RCCH into response/scheduled RCCHs and random access RCCHs can be achieved by controlling the BS 102 to transmit a new system parameter message. In this regard, the BS may set the response RCCH set to null, meaning it reverts back to the mode in which response messages are sent over the contention mode. Also, using an ISMA based random access also allows dynamic allocation of RCCH for random access or scheduled transmissions. In this event, the ISMA bit is set to busy for the scheduled RCCH before directing an access terminal 104 to use that channel for transmission.

Although the embodiments of the present invention are described above as being employed in a wireless communications system 100 such as a mobile cellular telephone system, the embodiments can be employed in any other type of multi-user wireless communication system in which data packets, such as random access control data packets or user data packets, are transmitted over reverse common channels (RCCHs). The embodiments described above are particularly useful in wireless communications systems in which short propagation delays are expected, such as in fixed or mobile Cellular/PCS systems, as well as in direct line of sight point-to-point or point-to-multipoint systems.

As can be appreciated by one skilled in the art, the ISMA protocol techniques using capture messages according to the embodiments of the present invention discussed above reduce the probability of collision between access data packets being transmitted by different access terminals 104, while also avoiding the interference created by unsuccessful access attempts by multiple access terminals 104. This results in better throughput and delay performance for each channel, as well as overall improved system and cell capacity.

Also, by forcing other non-captured mobile access terminals 104 to terminate their transmission immediately upon receipt of a capture message provides a framework in which the major part of long packets are protected from contention. Furthermore, the techniques enable the BS 102 to control the transmission power of the access terminal 104 whose access data packet signal was captured. In addition, the techniques provide for better link performance by allowing multipath combining of Rake, instead of path selection, to be used right after capture of the access data packet is completed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for establishing communication between a base station and a plurality of access terminals in a wireless communications system, comprising the steps of:

controlling said base station to monitor for receipt of an access data packet transmitted from any of said access terminals;

controlling said base station to transmit a message identifying one of said access terminals from which said access data packet is received as capturing one of a plurality of reverse channels, the message being received by said plurality of access terminals, the base station transmitting another message indicating capture of another one of the reverse channels in response to another access packet of another one of said access terminals, wherein the one reverse channel and the other reverse channel are concurrently captured; and controlling said base station to transmit a power control command to a certain access terminal from which said access data packet is received, to control a transmission power at which said certain access terminal transmits communication data to said base station.

2. A method for establishing communication between a base station and one of a plurality of access terminals in a wireless communications system, comprising the steps of:

controlling at least one of said access terminals to transmit a respective data portion, wherein said respective data portion includes identifying data of said one access terminal, and said identifying data includes data representing a PN-offset of an access PN-code;

controlling said base station to monitor for receipt of any said respective data portion transmitted from any of said access terminals;

controlling said base station to transmit message data for receipt by said plurality of access terminals when said base station receives said any respective data portion, wherein said message data is indicative of said identifying data; and controlling a certain access terminal whose said respective data portion is received by said base station to transmit another data portion for receipt by said base station, while controlling the other of said access terminals to refrain from transmitting additional data portions to said base station, wherein said one access terminal transmits said additional data portion after a delay period of time has elapsed from when said one access terminal completed transmitting its respective data portion.

3. A wireless communications system, comprising:

a plurality of access terminals, at least one of which being adapted to transmit at least a portion of an access data packet; and a base station, adapted to receive said portion of said access data packet and, in response, to transmit a message for receipt by said plurality of access terminals, said message indicating receipt of said portion of said access data packet by said base station and identifying said access terminal from which said portion of said access data packet is received, wherein said base station is further adapted to transmit a control signal to a certain access terminal from which said portion of said data packet is received by said base station, to control said certain access terminal to transmit another portion of said data packet for receipt by said base station after a delay period of time has elapsed from when said certain access terminal completed transmitting said portion of said data packet; and, wherein:

said based station is further adapted to transmit a control signal for controlling each of said access terminals, other than said access terminal from which said portion of said access data packet is received, which have begun transmitting a respective access data packet at the time said base station has received said access data packet, to refrain from transmitting a remainder of their respective access data packet in response to receipt of said message.

4. A wireless communications system, comprising:

a plurality of access terminals, at least one of which being adapted to transmit at least a portion of an access data packet; and a base station, adapted to receive said portion of said access data packet and, in response, to transmit a message for receipt by said plurality of access terminals, said message indicating receipt of said portion of said access data packet by said base station and identifying said access terminal from which said portion of said access data packet is received, wherein said base station is further adapted to transmit a control signal to a certain access terminal from which said portion of said data packet is received by said base station, to control said certain access terminal to transmit another portion of said data packet for receipt by said base station after a delay period of time has elapsed from when said certain access terminal completed transmitting said portion of said data packet; and wherein:

said base station is further adapted to transmit a power control command to a certain access terminal from which said portion of said access data packet is received, to control a transmission power at which said certain access terminal transmits communication data to said base station.

5. A wireless communications system, comprising:

a plurality of access terminals, at least one of which being adapted to transmit at least a portion of an access data packet, wherein said at least one access terminal includes identifying data in said portion of said data packet; and a base station, adapted to receive said portion of said access data packet and, in response, to transmit a message for receipt by said plurality of access terminals, said message indicating receipt of said portion of said access data packet by said base station and identifying said access terminal from which said portion of said access data packet is received, wherein said base station is further adapted to transmit a control signal to a certain access terminal from which said portion of said data packet is received by said base station, to control said certain access terminal to transmit another portion of said data packet for receipt by said base station after a delay period of time has elapsed from when said certain access terminal completed transmitting said portion of said data packet, wherein said base station includes in said message data indicative of said identifying data of said certain access terminal, and said identifying data includes data representing a PN-offset of an access PN-code.

* * * * *